United States Patent [19]

Beck et al.

[11] Patent Number: 4,799,811
[45] Date of Patent: Jan. 24, 1989

[54] AUTOMATIC RELOCATE ON CONTINUATION OF DOCUMENT PLAYOUT

[75] Inventors: James L. Beck, Versailles; Marguerite H. Doyle, Lexington; Roger W. Early, Lexington; Terrance W. Ringle, Lexington; David R. Smith, Lexington, all of Ky.

[73] Assignee: International Business Machines Corporation, Armonk, N.Y.

[21] Appl. No.: 876,633

[22] Filed: Jun. 20, 1986

[51] Int. Cl.$^4$ ............................................. B41J 5/30
[52] U.S. Cl. ..................................... 400/279; 400/63; 400/322; 400/697
[58] Field of Search ............... 400/63, 279, 290, 320, 400/322, 697, 697.1; 364/900

[56] References Cited

U.S. PATENT DOCUMENTS

| 4,252,451 | 2/1981 | Clancy | 400/322 X |
| 4,264,226 | 4/1981 | Bowles | 400/279 X |
| 4,279,523 | 7/1981 | Ringle | 400/279 |

Primary Examiner—Paul T. Sewell
Attorney, Agent, or Firm—Laurence R. Letson

[57] ABSTRACT

A typewriter is disclosed which is capable of storing text in a memory and playing out the stored text on command. When the print point is moved back into the printed text for any reason, the typewriter will automatically return the print point to the same position it occupied prior to being moved back into the text, prior to the resumption of printing.

4 Claims, 3 Drawing Sheets

The contract provisions are abundantly clear on that point.
The performance required is not subject to the
interpretation beign put forth by the opposing party,

AUTOMATIC RELOCATE ON CONTINUATION OF DOCUMENT PLAYOUT

FIELD OF THE INVENTION

This invention relates to word processing apparatus and the ability of the operator to produce error free documents with a minimum of effort. More specifically, the invention relates to insuring that the print point of a word processing device is returned to the point at which further playout of stored text should be made after the print point has been moved backward into the previously printed text for the purpose of making of corrections or insertions.

RELATED PATENTS

This application discloses and claims an improvement to the invention described and claimed in U.S. Pat. No. 4,252,451, issued to Douglas E. Clancy, et al and assigned to International Business Machines Corporation of Armonk, N.Y. The specification, drawings and claims of U.S. Pat. No. 4,252,451 is incorporated by reference into this specification and may be referred to in the course of the description of the invention.

BACKGROUND OF THE INVENTION

When a typist has stored text in a word processor and then wishes to play out that text to make corrections, the typist may control the play out to stop at a desired location for such corrections. If, for some reason, the playout point passes the point at which corrections or insertions are desired, the print point may be backspaced to that desired point and the changes made. On some word processing apparatuses, there exists a feature which permits the operator to return the print point to the rightmost position occupied by the print point on a print line, by the depression of the Relocate keybutton. Such a feature exists on the IBM QUIETWRITER Typewriters and the IBM WHEELWRITER Typewriters as well as other IBM Electronic Typewriters. The operation of this feature on the IBM typewriters identified above is described in the aforementioned U.S. Pat. No. 4,252,451 to Clancy et al. In addition, the IBM QUIETWRITER and WHEELWRITER Typewriters are capable of returning the print point of the typewriter to the rightmost position previously occupied in the last line of text printed, hereinafter referred to as the relocate point 101, from a position in any of the previous lines of text.

The typist must remember during playout to invoke the Relocate command after the changes are made or the text which is played out of memory, on command to "Play", will overstrike the text already on the paper and ruin the copy being printed. Many operators fail to depress the Relocate key after making the changes and thus create errors.

The term Reposition and Relocate may be used interchangeably in this specification as having the same meaning since the term Relocate has a specific meaning with respect to the IBM typewriters referenced above and many other typewriters having comparable functions to those of the IBM typewriters. The term Reposition derives from U.S. Pat. No. 4,252,451.

SUMMARY OF THE INVENTION

The invention provides an electronic solution to the problem of creating errors inadvertently, by invoking a signal, the equivalent of the keyboard entered signal for the Relocate function when the play key is depressed, and when the contents of the reposition registers indicate that there exists printed text either to the right of or below the point, relative to the paper, at which the print point resides. The reposition register described in the Clancy et al patent would have a larger value than the line count register indicating that text has been printed to the right of the print point position If the conditions exist in the reposition registers of the apparatus indicating that the print point lies within previously printed text, the Relocate function command is automatically invoked when the "Play" key is depressed After the Relocate function has been executed, the playout of the text is resumed.

DRAWINGS

A more complete understanding of the invention may be had by referring to the drawings in conjunction with the detailed description of the invention to follow.

DETAILED DESCRIPTION OF THE INVENTION

The following description will be made with respect to the drawings and constitutes the preferred embodiment of the invention. The preferred manner of implementing the invention is through the use of a microprocessor to control the word processing apparatus. The microprocessor preferably is an Intel 8031 and the preferred word processor may be one of the IBM WHEELWRITER 5 or IBM QUIETWRITER 7 Typewriters, manufactured and sold by the International Business Machines Corporation, Armonk, N.Y.

Figure 1:
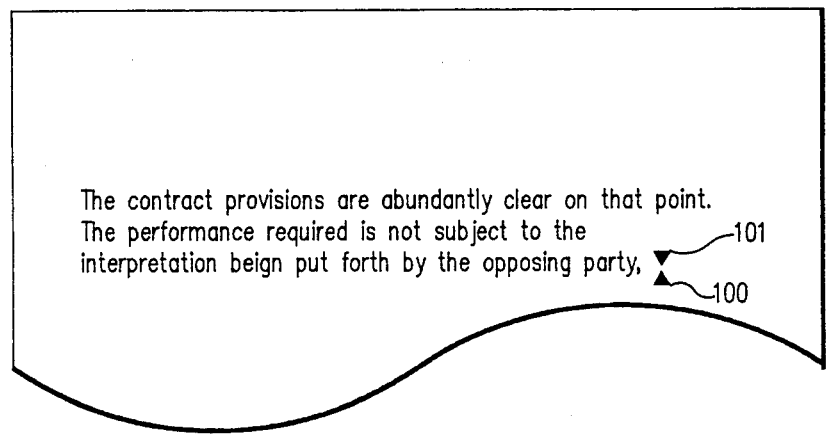
FIGS. 1, 2 and 3 are representations of a printed page which indicate thereon the relative positions of the print point at different stages of operation of the word processing apparatus incorporating the invention.
Figure 5:
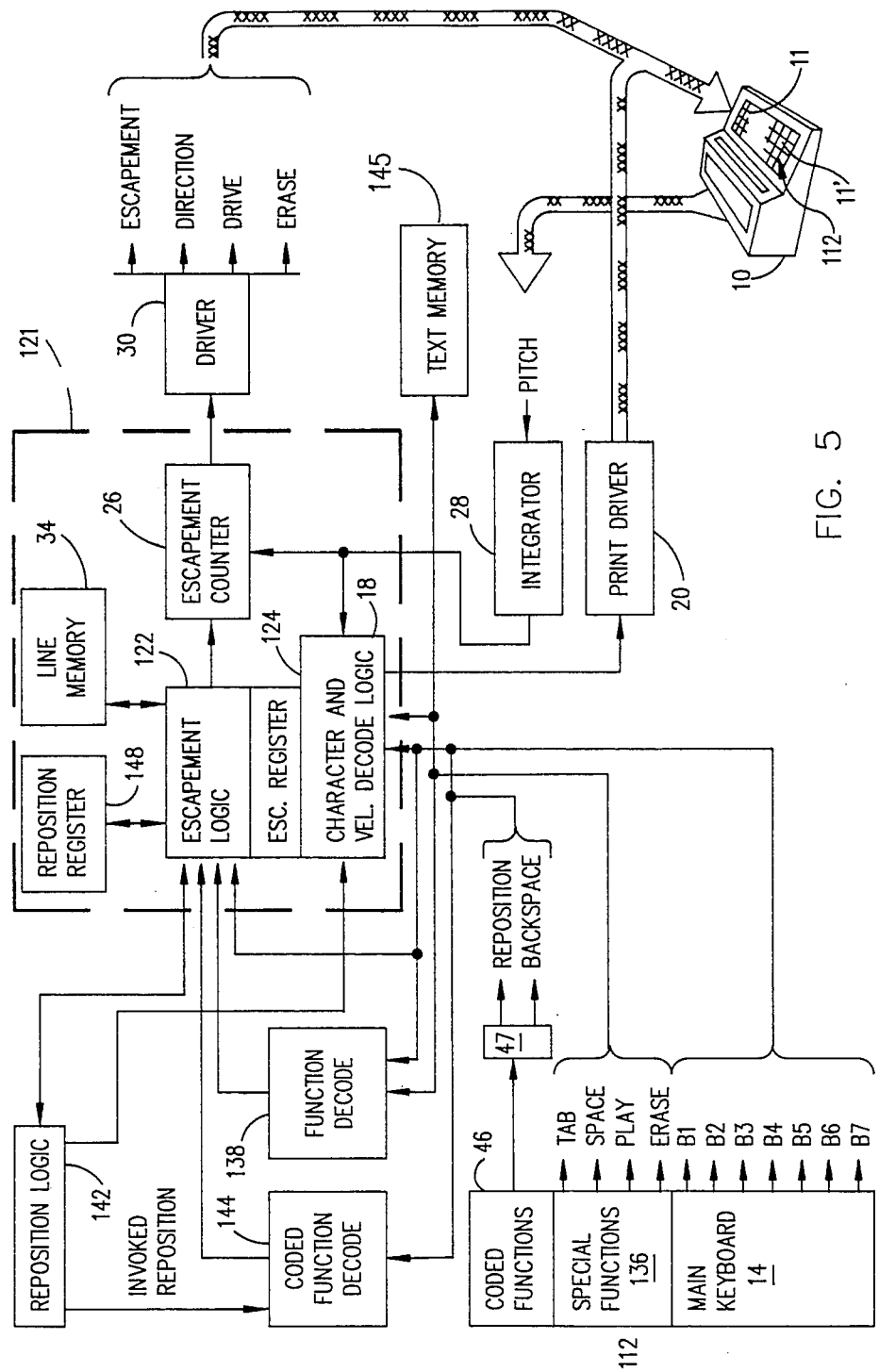
FIG. 5 is a block diagram of the typewriter having the invention implemented therein.

Referring to FIG. 1, there is illustrated text which has been played out of text memory 145 as shown in FIG. 5, which is a part of a larger block of text. As the playout progressed, an error was played out and is located in the third line of text at line count character positions 30–34 The word "beign" was erroneously entered and played out of memory. Since the desired word is "being", the "gn" in line count positions 33–34 need to be removed and the letters "ng" substituted therefor. The reposition register 148, reflecting the position of the print point 100 at the time of stopping playout, contains line number 9 (relative to the page) and line character position count 69. The print point 100 is represented by the pyramid symbol.

Figure 2:
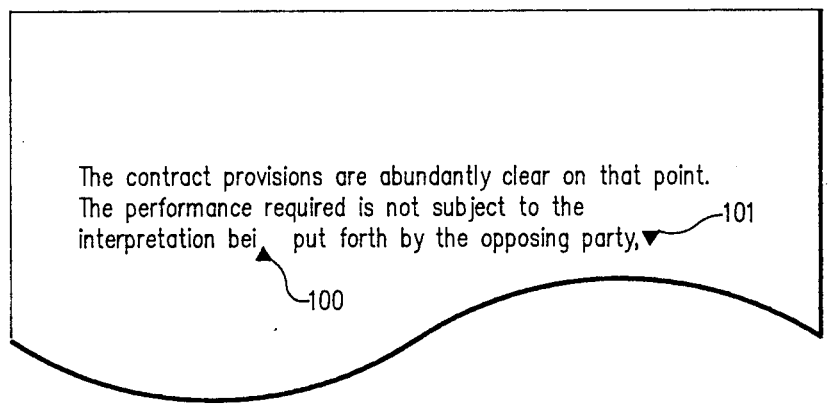

In order to correct the error, the print point 100 is moved back through the text to line 9, line character position count 35, at which time corrections are initiated, the letters "gn" removed and the print point 100 is moved to line character position count 33, as reflected in FIG. 2.

Figure 3:
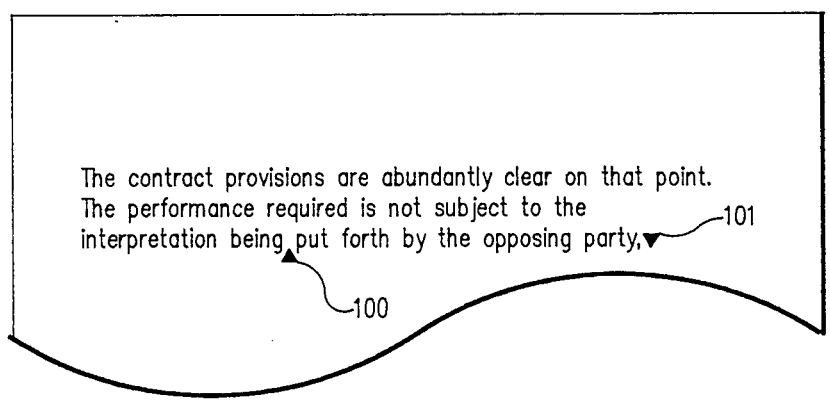

As the correct letters, "ng", are keyed by the typist, the print point returns to line character count position 35. This condition is illustrated in FIG. 3. It is at this point in the sequence of operations that the operator will enter a "Play" command from the special function section 136 of keyboard 112, in FIG. 5. With the print point at line count position 35 as in FIG. 3, the next text to be played out will overstrike and obliterate the text previously printed in positions 36-68. In order to avoid such a problem, a Relocate command needs to be keyed prior to the keying of the "Play" command. Typists often fail to remember the need for the Relocate command.

In the following discussion, the reference numerals used are in the 100-149 series with the tens and units digits identical to the reference numerals used in the referenced U.S. Pat. No. 4,252,451, where reference is made to FIG. 5. Where reference numerals are smaller that 100, the reference is to an element which may be found in FIG. 5 as well as in FIG. 1 of U.S. Pat. No. 4,252,451, and the elements are identical and description of the element and its function may be found by referring to the reference patent. The elements with 100-149 series reference numerals may be identical to or may be slightly changed to accommodate the additional function of the present invention. Elements in FIG. 4 do not have counterpart elements in the referenced patent and have reference numerals starting at 150.

Referring to FIG. 5, the special functions section 136 of keyboard 112 may provide a signal for resumption of play from memory, as is conventional in electronic typewriters such as the IBM WHEELWRITER 5 and QUIETWRITER 7 Typewriters. When a signal is received by the function decode block 138, the signal is decoded and the appropriate signal is sent to the electronics 121. The function decode 138 acts to determine whether the signal is a "Play" command. This decision is depicted in decision block 150 of FIG. 4 which should be referred to in parallel with FIG. 5. The flow diagram in FIG. 4 indicates the logical flow and the generation of commands to accomplish the function of the invention.

If the command is not a "Play" command the logic flow exits the subroutine and the typewriter or word processor acts to respond to the signal received.

Should the command be a "play" command, the logic flow is directed to decision block 152 which determines whether the print point 100, as indicated by the escapement register 124, is located at the relocate or reposition point 101 as indicated by the reposition register 148. Both the escapement register 124 and the reposition register 148 may maintain a count of line number and line character count or only line character count, depending upon the degree of sophistication desired for the typewriter 10. The determination made in decision block 152 may be as simple as a compare equal for the contents of the two registers 124, 148. If the compare is not equal, the NO path is followed to decision block 154 where the determination is made whether there is text printed to the right or below the print point position. This decision may be the result of subtracting the value of the print point line number from the reposition point line number and the print point line character position count from the reposition line character position count. If the line number difference is a positive number or the line number difference is zero nd the line character position count difference is a positive number, then text is printed to the right of or below the position of the print point 100. If this determination in block 154 results in a negative number, there is no need for a repositioning of the print point and the play command may be executed as in block 158.

Accordingly, when the determination in block 152 establishes equality in the current of text positions, then the print point is located at the reposition point 101 and there is no need to execute the reposition command. Therefore, the flow will follow the yes path to block 158 where the "Play" command is executed, and the text following the text previously printed is then printed.

Should the determination be made, at block 154, that there is text printed to the right of or below the print point position 100, it is then necessary to cause the relocate feature to execute. The reposition logic 142 will be activated by the sending of a reposition command to the reposition logic 142 from the coded function decode 144, followed by the subsequent execution of the "Play" command.

Figure 4:
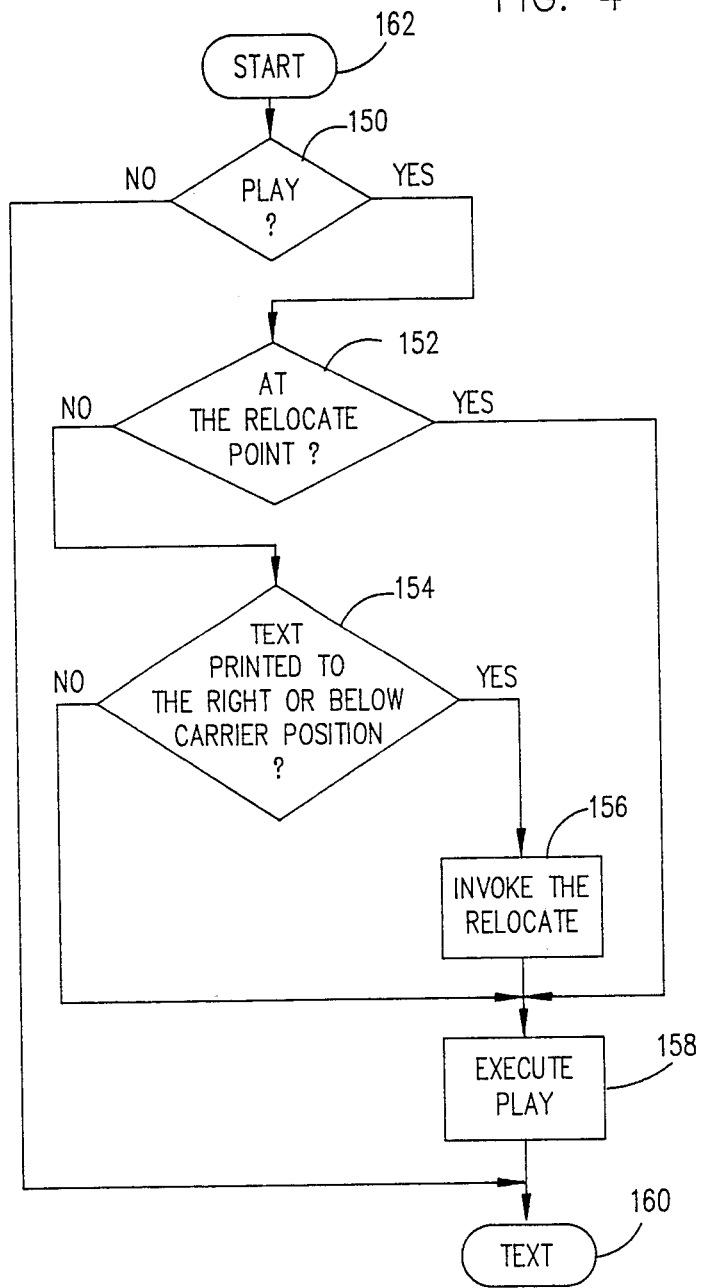
FIG. 4 is flow diagram illustrating the steps the logic of the word processing apparatus executes when the play command is keyed through the keyboard.

Following the execution of the "Play" command, block 158, the logic will exit the subroutine, illustrated at symbol 160, FIG. 4, and return to the main control program of the word processing apparatus or typewriter 10.

With an understanding of the subroutine as shown in FIG. 4, and the operation of the Reposition function described in U.S. Pat. No. 4,252,451, one may clearly understand that the described improvement will relieve the typist of the responsibility of remembering to key the relocate command after making a correction or other similar move back into the text, where the print point does not coincide with the point at which the print point resided when play out of the text was interrupted.

The above description is a description of the preferred embodiment of the invention as it would be embodied using a microprocessor such as an Intel 8031 microprocessor, manufactured and sold by Intel Corporation of Santa Clara, California. The microprocessor used in any particular implementation may be one of several provided by any number of manufacturers, and the choice is not limited to the one selected for the preferred embodiment.

The microprocessor is controlled by a program which is stored in memory and utilizes the inputs to the keyboard and other signal sources to operate to control the operation of the word processing apparatus. The program is written to perform the logic flow depicted in FIG. 4. A programmer of ordinary skill in the art of programming, given the flow diagram of FIG. 5, and an understanding of the particular microprocessor to be used, can write the detailed instructions necessary for the microprocessor to function to control the word processing apparatus in the desired manner, which can be expected to vary in detail without departing from the spirit and scope of this invention.

We claim:
1. A word processing apparatus comprising:
a keyboard for entry of data and control signals;
a platen;
printing means including means defining a print point;
escapement means for moving said print point along said platen to define a print line;
line index means for moving said print point from one print line to another print line;
backspace means for accomplishing retrogressive escapement of said print point along said print line;
memory means for storing codes representing text;
play means for accessing said memory means to retrieve said stored codes and controlling said printing means to print text representing said codes;
print point reposition means for returning said print point to the rightmost position previously occupied by said print point prior to the operation of said backspace means and/or said line index means to move said print point back into said text which has been printed in response to said play means;

and first means responsive to the operation of said play means to invoke the operation of said print point reposition means prior to the operation of said play means to print text thereby preventing the printing of text over text previously printed, without operator intervention to activate said print point reposition means prior to resumption of the operation of said play means.

2. The word processing apparatus of claim 1 further comprising second means responsive to said play means for determining the need for the operation of said print point reposition and the suppressing of said operation of said print point reposition means when said print point occupies a position which does not require the reposition operation.

3. The word processing apparatus of claim 2 wherein said second means responsive to said play means comprises a counter for maintaining an indication of the position of the printhead relative to the print line, and a second counter for maintaining an indication of the rightmost position occupied on a print line by said print point, and a logic means to compare the contents of said counters.

4. An electronic typewriter comprising:

operator entry input means;

print point positioning means;

first means to store data representing the position of the print point at the end of the printed text;

second means responsive to inputs from said operator entry means to operate said print point positioning means to bring said print point into text prior to said print point position at the end of the printed text;

third means, including logic means responsive to said first means to operate said print point positioning means to return the print point to the location of the print point at the end of the printed text; and means including logic means responsive to a signal from said operator entry means, to respond to an operator entry to print by operating said third means to return to the location of the print point position at the end of the printed text, prior to printing.

* * * * *